UNITED STATES PATENT OFFICE.

THOMAS H. SINDELL AND WILLIAM B. STEWARTSON, OF PITTSBURG, PA.

COMPOUND FOR THE MANUFACTURE OF GLASS.

SPECIFICATION forming part of Letters Patent No. 270,991, dated January 23, 1883.

Application filed May 20, 1882. (No specimens.)

*To all whom it may concern:*

Be it known that we, THOMAS H. SINDELL and WILLIAM B. STEWARTSON, of Pittsburg, in the county of Allegheny, and in the State of Pennsylvania, have invented certain new and useful Improvements in Compounds for the Manufacture of Glass; and we do hereby declare that the following is a full, clear, and exact description thereof.

This invention relates to certain improvements in the manufacture of glass; and it has for its objects to provide an improved vitrifiable composition of matter, and to produce a new article of manufacture which, besides possessing the characteristics of glass, will be more solid and less brittle, and will be adapted to many purposes for which the ordinary glass is not applicable.

Our improved composition consists of sand, soda, clay, lime, and salt. These, in a finely-divided state, are thoroughly mixed and commingled, and are melted together, either in a furnace or in the usual glass-pots heated in the ordinary glass-furnace, until a homogeneous fluid compound is produced. When thus mixed, melted, and combined, coloring materials—such as the protoxide of copper, black oxide of copper, or other mineral oxides—are added to the mass to produce the desired tint or color.

In carrying out our invention we have found the ingredients in the following proportions to answer well for general purposes, viz: sand, one hundred parts; soda, fifty parts; clay, one hundred parts; lime, twenty-five parts; salt, twenty-five parts. These, as before stated, are thoroughly mixed and melted in a proper furnace or crucibles, and when melted the materials to impart color to the mass are added, as before mentioned, and the whole is worked subsequently, in the same manner as ordinary glass, for the formation of various articles, by blowing, molding, casting, and otherwise. The material thus produced may be conveniently formed into building-blocks, ornamental vases, slabs, tiles, and, in fact, may be applied to all purposes to which stone and glassware have heretofore been applied.

Slate in combination with vitrifiable compounds has been heretofore employed in the manufacture of glass; but such will not produce the variety of glass that we obtain by our invention, and we make no claim to glass having slate as an ingredient.

Having thus described our invention, what we claim, and desire to secure by Letters Patent, is—

The compound herein described, consisting of sand, soda, clay, lime and salt, and the metallic oxides, combined in about the proportions and manner specified.

In testimony whereof we affix our signatures, in presence of two witnesses, this 12th day of January, 1882.

THOMAS H. SINDELL.
W. B. STEWARTSON.

Attest as to signature of Thomas H. Sindell:
THOMAS H. MANLEY,
JOSEPH H. RAMSEY.

Witnesses as to signature of W. B. Stewartson:
JOHN E. GRIPP
H. H. ALLISON.